(12) United States Patent
Singh et al.

(10) Patent No.: US 9,455,914 B2
(45) Date of Patent: Sep. 27, 2016

(54) FILE-SYSTEM REQUESTS SUPPORTED IN USER SPACE FOR ENHANCED EFFICIENCY

(71) Applicant: Robin Systems, Inc., Milpitas, CA (US)

(72) Inventors: Gurmeet Singh, Fremont, CA (US); Krishna Satyasai Yeddanapudi, Pleasanton, CA (US); Dhanashankar Venkatesan, San Jose, CA (US)

(73) Assignee: ROBIN SYSTEMS, INC., San Jose, CA (US)

( * ) Notice: Subject to any disclaimer, the term of this patent is extended or adjusted under 35 U.S.C. 154(b) by 16 days.

(21) Appl. No.: 14/275,666

(22) Filed: May 12, 2014

(65) Prior Publication Data

US 2015/0074683 A1  Mar. 12, 2015

Related U.S. Application Data

(60) Provisional application No. 61/876,045, filed on Sep. 10, 2013.

(51) Int. Cl.
| | |
|---|---|
| *G06F 9/50* | (2006.01) |
| *H04L 12/801* | (2013.01) |
| *G06F 9/455* | (2006.01) |
| *G06F 9/54* | (2006.01) |
| *H04L 12/851* | (2013.01) |
| *G06F 11/34* | (2006.01) |

(52) U.S. Cl.
CPC .............. *H04L 47/11* (2013.01); *G06F 9/455* (2013.01); *G06F 9/5038* (2013.01); *G06F 9/544* (2013.01); *G06F 9/546* (2013.01); *G06F 11/34* (2013.01); *H04L 47/2441* (2013.01); *G06F 11/3409* (2013.01); *G06F 11/3495* (2013.01); *G06F 2201/815* (2013.01)

(58) Field of Classification Search
None
See application file for complete search history.

(56) References Cited

U.S. PATENT DOCUMENTS

| | | | |
|---|---|---|---|
| 2003/0009538 A1* | 1/2003 | Shah et al. ..................... | 709/219 |
| 2006/0294234 A1* | 12/2006 | Bakke ..................... | H04L 69/16 709/225 |
| 2008/0154879 A1* | 6/2008 | Lin .................................. | 707/5 |
| 2009/0112880 A1* | 4/2009 | Oliveira ............ | G06F 17/30091 |
| 2009/0216520 A1* | 8/2009 | Khan et al. ..................... | 703/26 |
| 2013/0073813 A1* | 3/2013 | Bacik ............................ | 711/144 |
| 2015/0067005 A1* | 3/2015 | Avati ............................ | 707/827 |

* cited by examiner

*Primary Examiner* — Tuan Dao
(74) *Attorney, Agent, or Firm* — David R. Stevens; Stephen Preston; Stevens Law Group

(57) ABSTRACT

Systems and methods are disclosed for interacting with a file system. The file system is operable to reside in user space of a computing system. A module, also within user space, may provide a messaging service supporting requests from an application to the file system. By bypassing a System-Call Interface (SCI) of the computing system's kernel space, the module may support requests from the application to the file system with enhanced efficiency and/or customizable features not provided by the SCI. In some examples, the module may include a library in an independent layer within user space and below the application, allowing the library to provide an application-independent messaging service for different applications. Furthermore, in some examples, the module may include a segment of memory, within user space, shared between the application and the file system for passing data involved in requests and/or responses to and/or from the file system.

18 Claims, 9 Drawing Sheets

FILE-SYSTEM REQUESTS SUPPORTED IN USER SPACE FOR ENHANCED EFFICIENCY

RELATED APPLICATIONS

This application claims the benefit of and hereby incorporates by reference U.S. Provisional Application Ser. No. 61/876,045, filed on Sep. 10, 2013.

FIELD OF THE INVENTION

This invention relates to file systems for computing systems and more particularly to supporting requests from an application to a filing system with enhanced efficiency.

BACKGROUND OF THE INVENTION

Applications running in contemporary computing systems generate data and utilize data that is respectively stored in and retrieved from the computing system's file system. The tasks these applications are called on to perform are placing greater demands on the interactions between such applications and file systems. For example, in the context of a data center, applications are being called upon to process enormous and ever-growing amounts of data with operations that rely on file-system interactions.

Existing approaches to providing file-system services to applications may not be optimized to address current demand trends. Traditionally, the file system resides within the computing system's kernel, close to the underlying hardware where data is physically stored and from which it is retrieved. Applications can accomplish storage and retrieval of data in and from a file system, among other operations, through the constraints of system calls provided by the computing system's kernel.

An additional layer of abstraction is added for some computing systems in terms of a Virtual File System (VFS), also known as a Virtual Filesystem Switch. The VFS can provide an interface between the kernel and file system engaging the actual hardware. Providing such an interface may allow an application to interact with different kinds of file systems, allowing, for example, transparent access to local and networked storage devices. A VFS may also provide a bridge between the kernels of different operating systems.

Some existing approaches remove aspects of a file system from the kernel, placing those aspects in user space. Although much of the file space has been removed to the user space, existing examples of such approaches continue to send both requests from the application and responses from the file system through the kernel space. In so doing, such approaches utilize the existing infrastructure provided by the kernel to support interactions between an application and a file system.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not, therefore, to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, can be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout. In some cases, particular instances of an element in a figure may be identified with an identification number followed by a letter, where the letter may change from figure to figure for the same identification number, indicating differing instances of the element with the same or varying attributes. References to such elements by number only in the specification may refer more generally to a class of such elements.

Figure 1:
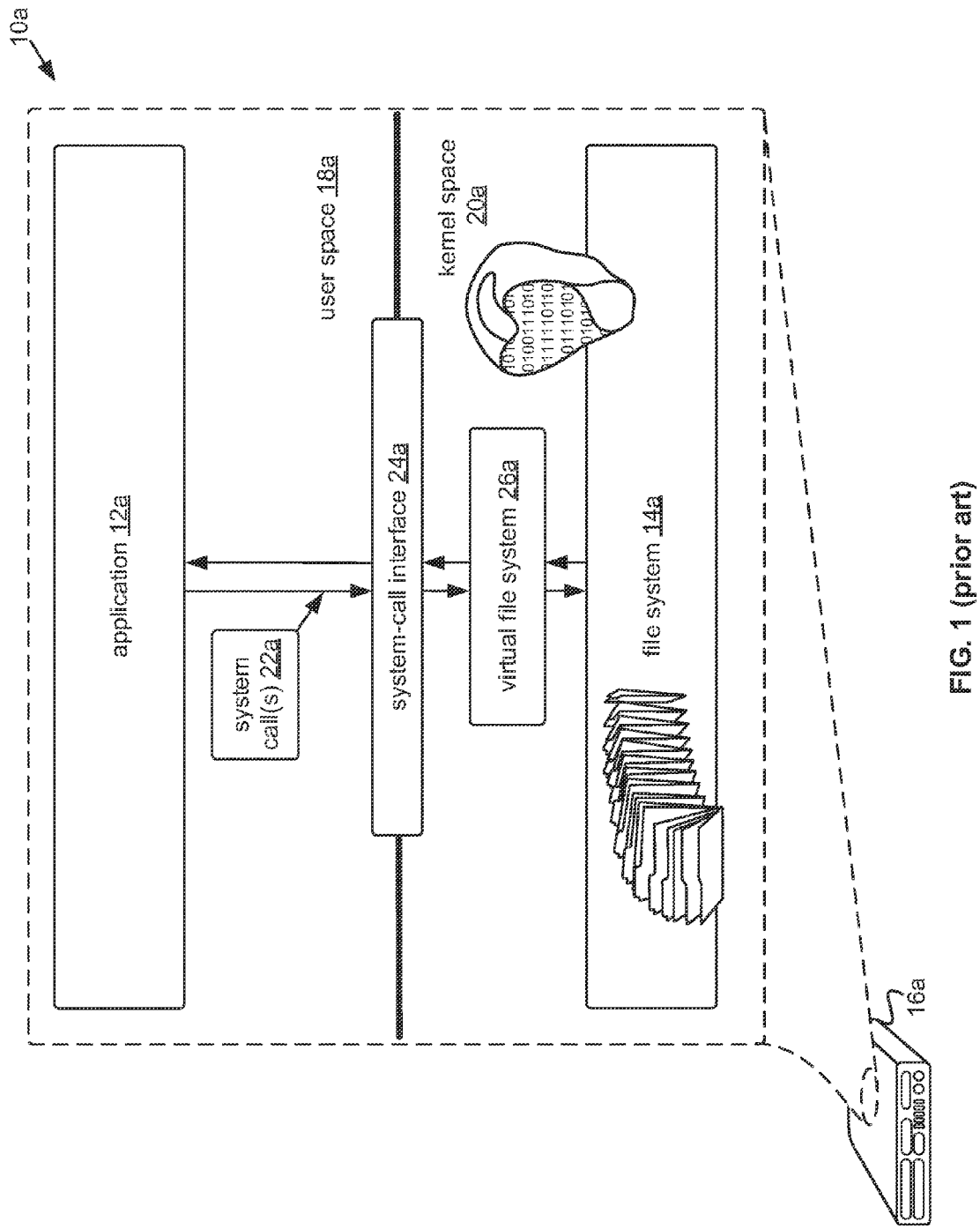
FIG. 1 is a schematic block diagram of a system call sent by an application via the kernel to a file system residing in the kernel, in accordance with prior art.

Referring to FIG. 1, an interaction-environment 10a is depicted for traditional interactions between an application 12a and a file system 14a. The interaction-environment 10a may reside on any contemporary computing system 16a. Examples of such contemporary computing systems 16a may include one or more of all manner of computing systems such as, without limitation, a server, a cloud-computing resource, a personal computer, a laptop, a mobile computing device, Solid State Drives (SSDs), an embedded system, or the like.

Whereas, the application 12a resides in user space 18a provided by the computing system 16a, the file system 14a resides in kernel space 20a of the computing system 16a. Throughout the discussions of existing art and disclosures of innovations herein, user space 18 and kernel space 20 may be associated with a segregation of virtual memory into two categories, performed by the operating system of the underlying computing system 16. This segregation can provide fault tolerance and differing levels of security.

In FIG. 1 through FIG. 4, the user space 18a is separated from the kernel space 20a, indicated by the depiction of a kernel sliced to reveal its content of binary code, by the thick bold line. System calls 22a from the application 12a to the file space 14a may be received at a System Call Interface (SCI) 24a, or the like. The SCI 24a may reside between the kernel space 28 and the user space 18a, within the kernel space 20a while not within the kernel's core, or within the kernel 20, depending on the example. The SCI 24a provides the means to perform the services associated with the system calls 22a (also referred to as kernel calls 22a) from user space 18a to the kernel 20a, including services that enable interactions with the file system 14a.

The application 12a, residing in user space 18a, sends one or more system calls 22a to the SCI 24a to interact with the file system 14a. For example, and without limitation, to store data in the file system 14a, the application 12a may send an appropriate system call(s) 22a to the SCI 24a, resulting in the kernel 20a storing data in the file system 14a. As another non-limiting example, to retrieve data from the file system 14a, the application 12a may also send the relevant system call(s) 22a to the SCI 24a, resulting in the kernel 20a retrieving the relevant data from the file system 14a.

Since reading, writing, storing, and retrieving data, and such activities, involve interactions with underlying physical hardware and the data involved raises issues of security, it made sense to rely on system calls 22 to the kernel 20 and to place the file system 14a in the kernel 20. However, these decisions in traditional interaction-environments 10a have implications. As can be appreciated, the SCI 24a accommodates a limited range of system calls 22.

For example, and without limitation, system calls 22 supported by the SCI 24a and/or its corresponding operating system are limited with respect to the size of data that may be written to the file system 14a and the size of data that may be read from the file system 14a for a given interaction between the file system 14a and the application 12a. Additionally, and also without limitation, limits are imposed by the supported system calls 22a as to the amount of semantic information, such as, without limitation, file names, that may be conveyed by the application 12a to the file system 14a. Placing the file system 14a in the kernel 20 may also make the file system 14a inflexible and resistant to change due to the lengthy and involved requirements for making changes to the core of an operating system. Also, as part of the kernel 20a, the limitations of the operating system to which the kernel 20 pertains and/or the kernel 20 itself may be imposed on interactions with the file system 14a.

One way in which the limitations of the operating system, the kernel 20a, and/or the file system 14a can be ameliorated to a degree is through the use of a Virtual File System (VFS) 26a, also known as, by way of example and without limitation, a Virtual Filesystem Switch 26a, or an Installable File System 26a. The VFS 26a, like the file system 14a, is usually implemented in kernel space 20a, but, depending on the implementation, can be viewed as an interface with the kernel 20a, or as existing outside of the Kernel 20a, as with MICROSOFT's Installable File System. As discussed in the Background Section, a VFS 26a provides a layer of abstraction that can be used to interact with different underlying file systems 14 in the same manner via the brokering services of the VFS 26 that present files and/or directories to an application 12 in a uniform way.

The VFS 26 provides this uniform presentation regardless of whether a file and/or directory comes from, without limitation, a file system 14 of the operating system maintained on a hard disk, removable storage media (such as, without limitation, a Digital Versatile Disc (DVD) or a Universal Serial Bus (USB) drive), or a networked server. As a result of the VFS 26, an application 12 is not limited to a single file system 14 or even a file system 14 local to the kernel 20. An application 12 may also, or in the alternative, interact with a networked file system 14. Additionally, the VFS 26 can make up for differences between file systems 14, such as differences in file systems 14 pertaining to different operating systems.

Therefore, a VFS 26 can provide added flexibility in terms of making possible interactions with multiples file systems 14, networked file systems 14, and different types of file systems 14, such as those pertaining to different operating systems. However, inasmuch as those file systems 14 rely on system calls 22 to the SCI 24, interactions between an application 12 and a file system 14 remain constrained within the scope of offerings provided by the SCI 24. Furthermore, inasmuch as underlying file systems 14 remain embedded in a kernel 20, the flexibility to experiment with the underlying file system 14 is constrained by the many procedural checks and safeguards required of any alterations to an operating system's kernel 20. However, the presence of a VFS 26 has also been used to address some of this second set of constraints.

Figure 2:
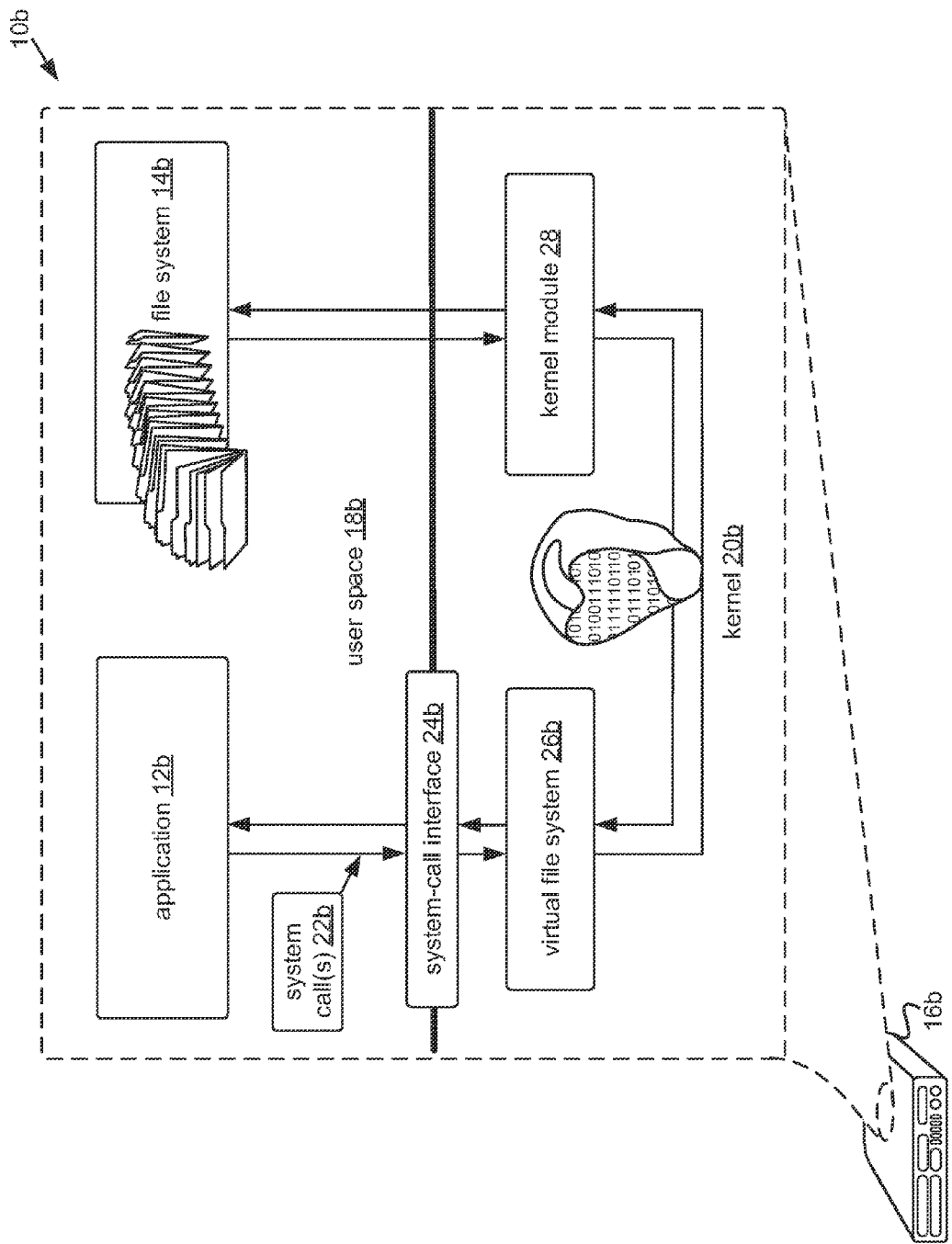
FIG. 2 is a schematic block diagram of another example of a system call also sent by an application via the kernel, but this time to a file system residing in the user space, in accordance with prior art.

Referring to FIG. 2, a computing system 16b supporting an altered interaction-environment 10b is depicted. The altered interaction-environment 10b also provides a space for interactions between an application 12b and a file system 14b, but includes the alteration of placing aspects of the file system 14b in the user space 18b, as opposed to the traditional approach, whereby the file system 14a, as depicted in FIG. 1, is placed in the kernel 20a. As discussed with respect to the previous figure, in FIG. 2, the user space 18b is depicted as the region above the thick bold line intersecting the interaction-environment 10b, and the kernel space 20b is depicted as the region below that line.

An SCI 24b for the kernel 20b and capable of receiving one or more system calls 22b is also depicted. The SCI 24b is operable to interact with a VFS 26b to facilitate interactions with the file system 14*b*. The ability of the VFS 26*b* to interface with different file systems 14 can be leveraged to place the file system 14*b* in user space 18*b*. However, the flexibility provided by the VFS 26*b*, on its own, is not sufficient to enable interactions with a file system 14*b* residing in user space 18*b*. A VFS 26 lacks methods relied upon by a file system, such as, by way of providing examples in pseudo code and not by way of limitation: 'open( )'; 'close( )'; 'read( )'; and 'write( )'. Therefore, current approaches to placing the file system 14*b* in user space 18*b* rely upon additional infrastructure added to the kernel 20*b* in the form of a kernel module 28. In other words, the file system 14*b* does not reside in user space 18 independent of the kernel 20*b*, but provides an additional, higher-level layer of operations and functionality.

The kernel module 28 can provide methods for implementing a file system 14*b* and allows code in user space 18*b*, such as a user-space file system 14*b*, to be plugged into the VFS 26*b*. Such a kernel module 28 can be implemented as a Loadable Kernel Module (LKM) comprising one or more object files with object code to extend a running kernel 20 or can already be merged with a base kernel 20. A non-limiting example of such a kernel module 28 is a Filesystem in User Space (FUSE) module 28. Non-limiting examples of user-space filesystems that run supported by a kernel, FUSE module 28 may include, without limitation, ZFS-FUSE and Hadoop Distributed File System (HDFS)-FUSE.

By providing methods within the kernel 20*b* capable of supporting implementations of file systems 14 and by providing a link with the VFS 26*b*, the kernel module 28 can provide infrastructure supporting a user-space file system 14*b*. The ability to place the file system 14*b* in user space 18*b* can provide advantages. For example, file systems 14 can be written tailored to any number of computing environments, regardless of the idiosyncratic nature of such file systems.

Obstacles to getting a file system 14 incorporated into a kernel 20 include: understanding of kernel programming; the standards to be met; concessions to other demands placed on the kernel 20; and, potential impacts to other aspects of the fundamental software for a computing system 16 that is the kernel 20. For reasons such as these, file systems 14 implemented within a kernel 20 tend to favor features with more generic applicability. Furthermore, placing the file system 14*b* in user space 18*b* can encourage flexibility and experimentation because a serious error in such a file system 14 can result, in the worst case, in a crash of the user-space file system 14*b*, as opposed to a kernel panic that may result from a serious error in a kernel-space file system 14*a*. Also, the infrastructure provided by the kernel module 28 allows a developer to write file-system solutions without having to code, or even understand, all of the inner workings of a file system 14. Conversely, however, placing some of the more fundamental attributes of a file system 14 in the kernel module 28 can place a barrier to the streamlining of such elements for a file system 14*b* written in user space 18*b*.

As can be appreciated from FIG. 2, approaches to a user-space file system 14*b* that rely on a kernel module 28 can also rely on both the VFS 26*b* within the kernel space 20*b* and the SCI 24*b* of the kernel 20*b* to provide a uniform interface with the application 12*b*. In such approaches, therefore, all interactions between the application 12*b* and the file system 14*b*, although both reside in user space 18*b*, are still conducted through the kernel 20*b*. Consequently, the application 12*b* is limited in the requests it can make upon the file system 14*b* by the system calls 22 supported by the SCI 24. By way of example and not limitation, some examples of such limitations include the size of data that may be read from and/or written to a file or the amount of semantic information the application 12*b* may convey to the file system 14*b*.

Additionally, because a user-space file system 18 can utilize both a buffer, or page cache, of the kernel 20 together with a buffer provided for a library supporting the open-space file system 18, to perform operations such as read and write, two additional copies to and/or from these buffers may take place, reducing efficiency. The presence of these multiple buffers and/or page caches can also lead to redundant, and inefficient, copies of data. Utilization of a kernel module 28 also introduces overhead in the form of multiple context switches that are performed for each system call 22*b* directed at the file system 14*b*, involving multiple switches by the scheduler between processes with different address spaces. Each switch may entail saving and/or restoring registers, flushing and/or reloading of buffers, and/or flushing of a processor pipeline. A simple kernel-space file system 14*a* simply involves a switch from unprivileged to privileged mode, or vs. versa. Additional overhead issues not discussed herein will be apparent to those of ordinary skill in the art.

To overcome limitations such as these, while maintaining and/or improving on the advantages of a file system 14*b* residing in user space 18*b*, several innovations are disclosed herein. The following discussion of a system for handling file-system requests from an application 12 provides a non-limiting example of principles at play in such innovations. In such a system, the application 12 may reside in user space 18 of a computing system 16 providing processing logic and memory. The system may also include a file system 14 operable to reside in the user space 18 of the computing system 16. Also residing in the user space 18 may be a customizing-interface module, also referred to as a messaging module.

The customizing-interface module may be operable to provide a messaging service, within the user space 18, between the application 12 and the file system 18. The messaging service may support a file-system request from the application 12 to the file system 14. Furthermore, the messaging service may be made customizable to the file-system request by bypassing an SCI 24 of the computing system's 16 kernel space 20.

Some examples may also include a library/messaging layer within the user space 18 and below the application 12. The library layer may contain the customizing-interface module. In such examples, the customizing-interface module may be application agnostic, meaning that the customizing-interface module is able to interact with different applications and is not limited to any particular application in the services it provides. The application-agnostic nature of the customizing-interface module may be enabled by the library layer being separate from the application 12.

Additionally, the customizing-interface module may also include a library with a set of system-call emulations supported within the messaging service. The set of system-call emulations may include a first subset of emulations of standard system calls and/or a second subset of emulations of non-standard system calls. Standard system calls may emulate common system calls, such as those found in one or more versions of an SCI 24. Non-standard system calls may offer customizable options for file-system requests beyond options offered by the SCI 24 of the computing system's 16 kernel space 20.

In some of such examples, the library may include an analysis module and/or an anticipation module. The analysis module may be operable to analyze file-system requests from the application 12 to detect a pattern. The anticipation module may be operable to implement caching and/or of prefetching of data, anticipated by the pattern, at the library layer.

Certain examples may utilize a shared memory segment within the customizing-interface module to assist in providing the messaging service between the application 12 and the open-space file system 18. In such examples, the shared memory segment may be accessible by both the application 12 and the file system 14. Additionally, the shared memory segment may be operable to support the messaging service by storing data from the application 12 and the file system 14, customizing the messaging service to avoid copying of read data and/or write data between the kernel space 20 and a buffer maintained by the application 12 and/or a buffer maintained by the file system 14.

In some of such examples, the shared memory segment may include a ring buffer. The ring buffer may provide an array of message-request slots. An individual message-request slot may be operable to implement a message service between an application 12 and the file system 14. Therefore, multiple message-request slots from the array may implement messaging services between the file system 14 and multiple applications 12 concurrently.

A more detailed disclosure of the innovations set forth above, together with related innovations, are set forth below. FIG. 3 through FIG. 9 are referenced in this discussion for purposes of explanation and not limitation.

Figure 3:
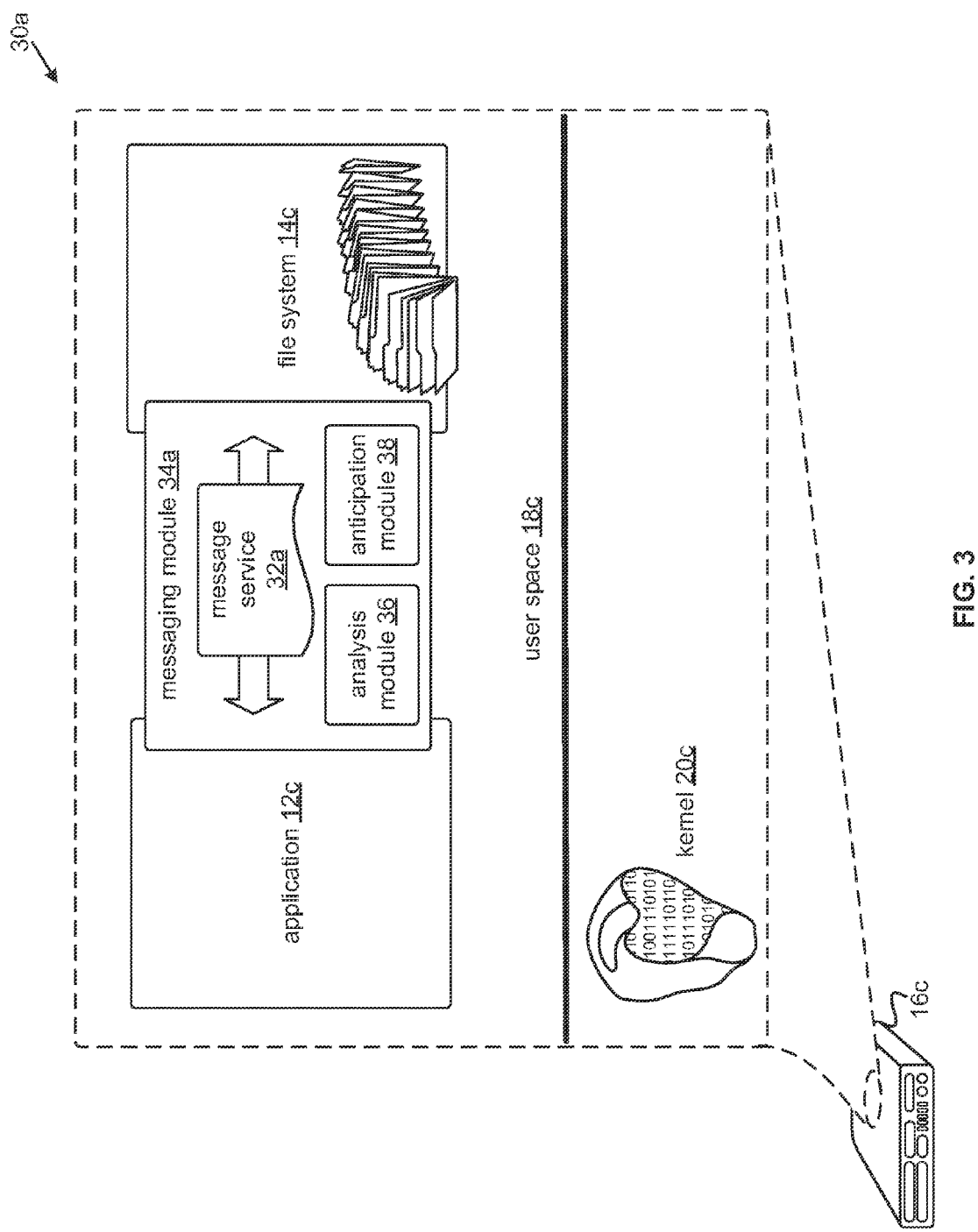
FIG. 3 is a schematic block diagram of message passing enabled in user space between an application and a file system, both of which also residing in user space, to support requests to and responses from the file system, in accordance with examples disclosed herein.

Referring to FIG. 3, a modified computing environment 30a supporting a user-space message service 32a is depicted between an application 12c and an open-space file system 14c. Placing interactions between an application 12c and a file system 14c in user space 18c involves completely changing existing approaches and concepts to this problem and places them upside down. The guiding principle of routing file-system requests from an application 12 through a kernel 20 and its system calls 22 to handle system-level operations, such as storage and retrieval, would be abandoned. As a result, a new infrastructure for such interactions may be provided.

The messaging service 32a may be implemented, without limitation, by a single method, or combination of methods, falling under the rubric of Inter-Process Communication (IPC), inter-thread communication, or inter-application communication, as supported by operating systems compliant with Portable Operating System Interface (POSIX) standards. By way of example, and not limitation, shared-memory methods of IPC will be discussed in greater detail below.

The modified computing environment 30a, supported by a computing system 16c, may be modified in the sense that interactions between the application 12c and the file system 14c may take place in user space 18c and avoid aspects of the kernel 20c. To enable interactions between the application 12c and the file system 14d in user space 18, the file system 14d itself may be made operable to reside in user space 18. By way of example and not limitation, the file system 14 may be implemented as an application operable to provide the services of a file system 14, such as, without limitation, imposing a specific organization upon files generated by other applications 12.

Aspects of a file-system implementation, such as, without limitation, storage and retrieval operations, involving interactions with devices, such as storage media, may be accomplished, without limitation, by use of user-space device drivers. User-space device drivers may be developed with frameworks such as, without limitation, in the context of a LINUX operating system, Userspace I/O (UIO). Such UIO drivers may be used to enable interactions with storage media while avoiding the SCI 24, the VFS 26, and/or other aspects of the kernel 20. By avoiding aspects of the kernel space 20c, the messaging service 32a may free itself from the limitations inherent to the system calls 22 supported by the SCI 24. Many possibilities, therefore, present themselves with respect to providing greater flexibility for requests from applications 12 and responses from file systems 14.

By way of example and not limitation, increased sizes for data that can be read and/or written for a given unit of time may be provided for. As can be appreciated, many additional enhancements may be implemented to further increase the ways in which the messaging service 32a may be customized and/or tailored to more efficiently meet the file-system requirements of the application 12c. As one additional, non-limiting example, the messaging service 32a may accommodate increased amounts of semantic information in requests from the application 12c to the file system 14c. A non-limiting example of such increased semantic information may include an access pattern anticipating one or more requests that will follow. Furthermore, by avoiding the kernel space 20c, the overhead associated with the kernel module 28 can be avoided together with the inaccessibility to aspects of the file system 14 infrastructure.

A messaging module 34a, also referred to herein as a customizing-interface module 34a, may be provided in the user space 18a to implement the message service 32a that supports interactions between the application 12c and the file system 14c in fulfillment of the application's 12c file-system needs. The customizing-interface module 34a is depicted as overlapping both the application 12c and the file system 14c, as well as portions of user space 18c outside of these two entities 12c, 14c. These schematic relationships are used to indicate that the messaging module 34a may be implemented with one or more portions pertaining to the file system 14c, the application 12c, and/or separate and apart from these two entities 12c, 14c. In other words, in some embodiments, the messaging module 34a may be implemented independent of either the application 12c and/or the file system 14c. In other examples, a portion of the application 12c and/or the file system 14c may be involved in the implementation of the messaging module 34a.

In some examples, multiple file-system processes may run in the user space 18, and individual file-system processes may service different mount points. In some of such examples, different individual file-system processes may service different file systems 14. Where multiple file-system processes are involved, the messaging module 34 may interact with multiple file-system processes. Also, where multiple file-system processes are involved, the messaging module 34 may determine the file system 14 to use for an application request based on one or more arguments passed by the corresponding application 12, in some examples with the assistance of the analysis module 36. One non-limiting example of such argument(s) may include, for example, a path of a file to open in response to a request from an application 12. As can be appreciated, in such examples, multiple applications 12 may use the serves of multiple file systems 14 concurrently.

As with other functionalities of the innovations disclosed herein, the functionalities of the message service 32a are provided by a module, namely a messaging module 34a, or customizing-interface module 34a. Throughout this patent application, the functionalities discussed herein may be handled by one or more modules. With respect to the modules discussed herein, aspects of the present innovations may take the form of an entirely hardware embodiment, an entirely software embodiment (including firmware, resident software, micro-code, etc.), or an embodiment combining software and hardware aspects that may all generally be referred to herein as a "module." Furthermore, aspects of the presently discussed subject matter may take the form of a computer program product embodied in any tangible medium of expression having computer-usable program code embodied in the medium.

With respect to software aspects, any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that may contain, store, communicate, propagate, or transport the program for use by or in connection with the instruction execution system, apparatus, or device.

Computer program code for carrying out operations of the present invention may be written in any combination of one or more programming languages, including an object-oriented programming language such as C++, or the like, and conventional procedural programming languages, such as the "C" programming language, or similar programming languages. Aspects of a module, and possibly all of the module, that are implemented with software may be executed on a micro-processor, Central Processing Unit (CPU) and/or the like. Any hardware aspects of the module may be implemented to interact with software aspects of a module.

As additional examples of modules that may be implemented to facilitate user-space 18 interactions between an application 12 and a file system 14, the messaging module 34 may include an analysis module 36 and/or an anticipation module 38. The analysis module 36 may receive, without limitation, requests, identification information, messages, and/or other information from the application 12c. The analysis module 36 may also include one or more algorithms operable to analyze requests from the application 12c to detect one or more patterns of requests, or other requirements, from the application 12c to the file system 14c. Additionally, without limitation, the analysis module 36 may be operable to identify the application 12c from identification information it receives and/or one or more protocols to respond to messages and/or instructions from the application 12c.

Upon identification of an application 12c, the messaging module 34 may provide customized services tailored to the application 12c to more efficiently facilitate interactions between the application 12c and the file system 14c. By way of example and not limitation, in the context of a data center, a distributed file system 14 may interact with various applications implementing various forms of parallel processing, cloud computing, and the like on large amounts of data. Different approaches taken by different applications, such as, without limitation, HADOOP, CASSANDRA, AND OPENSTACK, may have different requirements for which the messaging module 34 may provide customized services that may trigger upon identification of the application 12c.

The anticipation module 38 may be operable to perform caching and/or prefetching of data to anticipate one of more patterns of requests, or other requirements of the application 12c, detected, received, and/or determined by the analysis module 36. Hence, together, the analysis module 36 and the anticipation module 38 may be operable to provide one or more services customized to the application 12c by caching and/or pre-fetching data from the file system 14c anticipated by the pattern detected among the requests.

Figure 4:
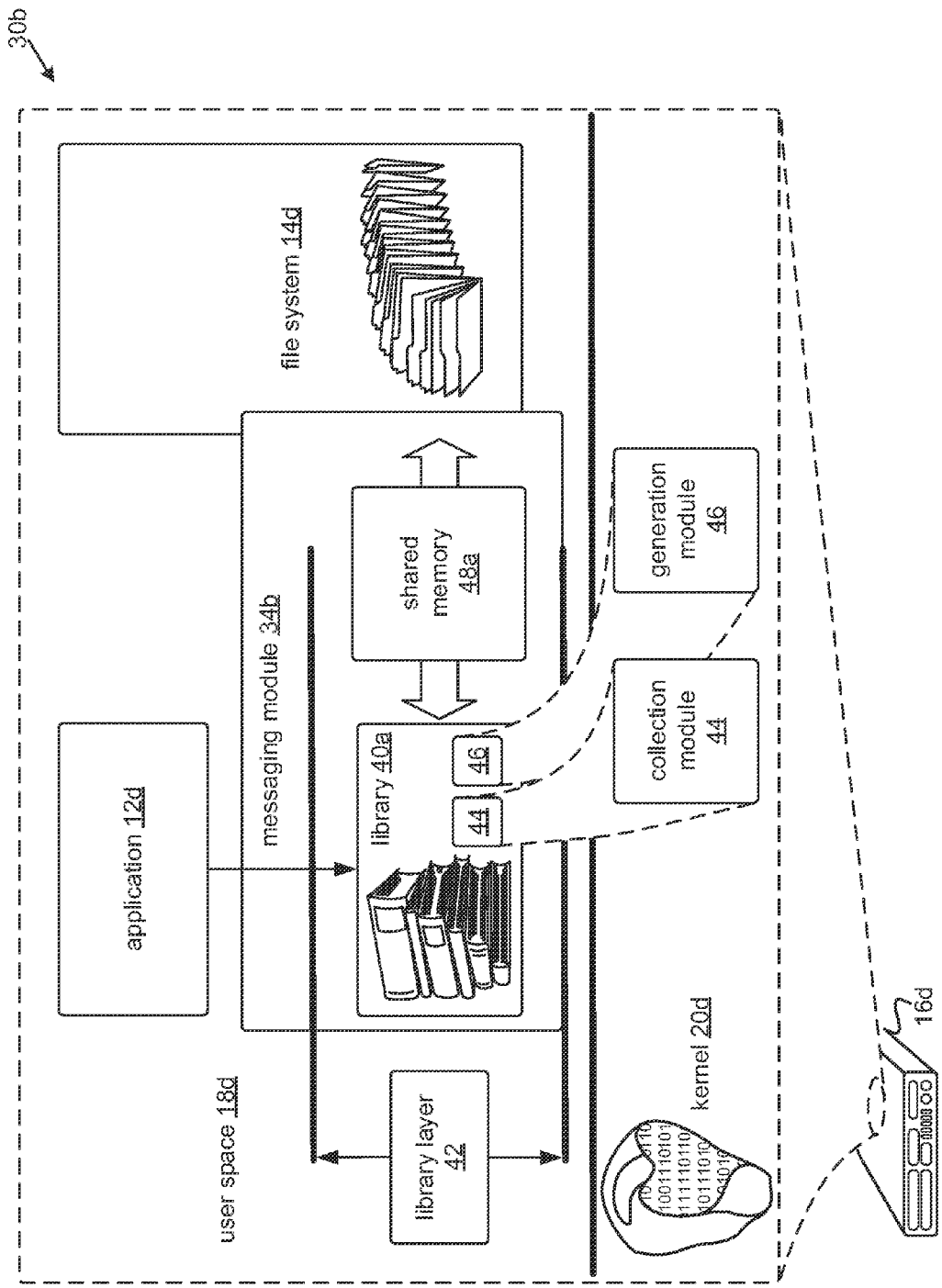
FIG. 4 is a schematic block diagram of a library residing independently below an application in user space to support file-system requests from different applications and offer an opportunity to customize services for such requests, also depicted is a segment of user-space memory shared between the application/library and the file system, demonstrating one way to support such file-system requests in user space, in accordance with examples disclosed herein.

Referring to FIG. 4, a library 40a residing independently within a library layer 42 is depicted below an application 12d in another computing environment 30b for interactions between the application 12d and a file system 14d within user space 18d, while avoiding the kernel 20d of the underlying computing system 16d. The library 40 may reside within the message/customizing-interface module 34b, which may also entirely reside within the library layer 42, or, in the alternative, include a portion outside the library layer 42, such as, without limitation, within the application 12d. Although the library 40a may be independent of the application 12d, access to the library 40a may be given to the application 12d by placing the library 40a in the process context of the application 12d, since loading the library 40a into the process context of the application 12d may be performed without changing the application 12d and with the same access permission as that of the application 12d. Within the user space 18d, a system is depicted for providing enhanced file-system services to the application 12d.

As before, the system may include a file system 14d, operable to function within user space 18d, and a messaging module 34b, also operable to function in user space 18d. The messaging module 34b may broker requests from the application 12d to the file system 14d and responses to the requests within user space 14d. Hence, the system can avoid the constraints, as discussed, on interactions imposed by an SCI 24, also referred to as a kernel-space interface 24 for system calls 22, and/or a kernel module 28.

The library 40a, which may be included within the messaging module 34 may be operable to provide one or more services customized to the application 12d providing requests to the messaging module 34b and/or responses to those requests. Such services may provide an efficiency not offered by the kernel-space interface 24 for system calls 22. In examples where the library 40a resides in an independent library layer 42, also referred to as a messaging layer 42, within user space 18d and below the application 12d, the messaging module 34b and/or the library 40a may be separated from the application 12d by the independent layer 42. In such examples, the messaging module 34b and/or the library 40a may be operable to service different applications 12. Because the messaging layer 42 remains separate from the application 12d and remains within the user space 18d, the library/messaging layer 42 allows the messaging module 34b and/or the library 40a to be independent of an approach to formulating requests to the file system 14d, as utilized by the application 12d.

In a sense, therefore, the library 40a and/or the messaging module 34b may become application agnostic and able to support several different types of applications 12 with different request formats. Additionally, for applications 12 distributed in binary form, thus preventing access to the source code and the ability to make modifications to implement aspects of the messaging module 34 and/or the library 40, application independence allows the messaging module 34 and/or the library 40 to service these applications 12. Reliance on such modifications to applications 12 also would present logistical obstacles in an environment with many applications and/or may computing systems 16.

One non-limiting way in which the library 40a may provide services customized to the application 12d, in certain examples, involves the analysis module 36. The analysis module 36 may reside in the library 40a and be operable, among other things, to analyze requests from the application 12d for one or more patterns among the requests. Some examples may include a segment of library memory operable to receive data from the file system 14d. This segment of library memory may enable pre-fetching and/or caching operations, as discussed above with respect to the anticipation module 38.

Another non-limiting example of a way the library 40a may provide customized services is through a set of system-call emulations. A system-call emulation may implement one or more operations, within the messaging service 32, previously provided by a system call 22 to an SCI 24 in existing technologies. More specifically, operations provided by system-call emulations provided in the set of system-call emulations may be equivalent to, similar to, provide enhancements upon, and/or provide new functionalities, with respect to operations previously provided by one or more system calls 22 to an SCI 24.

For example, the set of system-call emulations may include a first subset of emulations of standard system calls that may be equivalent to and/or similar to system calls 22 provided by an SCI 24 and a second subset of emulations of non-standard system calls offering new and/or enhanced operations. The independence of the messaging module 34 and/or the library 40 from the kernel 20 may provide a space in which operations offered to applications 12 for interactions with the file system 14 may be customized and/or tailored to individual applications 12, or types of applications 12, experimented with, and/or altered with relative ease.

With respect to the emulation of standard system calls 22, the library 40 and/or the messaging module 34b may include a collection module 44 and/or a generation module 46. The collection module 44 may be operable to trap, from the application 12d, system calls 22 used by the application 12d for implementation of file-system requests. The generation module 46 may be operable to generate at least a portion of the set of system-call emulations to emulate system calls 22 trapped by the collection module 44. In examples for which non-standard emulations of system calls are not provided, enhanced and/or customized services may be provided to an application 12d in terms of the analysis of requests 12d and/or caching and/or pre-fetching services based on patterns detected during analysis. Examples may also include both emulations of non-standard system calls together with analysis, caching, and/or pre-fetching capabilities.

The library 40a may match requests, messages, instructions, application-identification information, or the like, to emulations of standard and/or non-standard system calls to provide enhanced interactions between the application 12d and the file system 14d through the messaging service 32. For certain examples where access to an application's 12d source code is available, the application 12d may be modified to select an appropriate emulation of a non-standard call for a file-system request to, customize the messaging service 32 to the file-system request.

Although the messaging module 34, library 40 and/or library layer 42 may enable efficiencies through avoiding the kernel 20 of the underlying computing system 16, such avoidance may not necessarily be absolute in all examples. For instance, in some examples, the messaging module 34, library 40 and/or library layer 42 may be operable to selectively choose one or more file-system calls to service via one or more emulations of such system calls within the messaging module 34, library 40 and/or library layer 42, while allowing one or more other system calls to flow through to the kernel 20 via an SCI 24. For architectures in accordance with such examples, the library 40 may be implemented in a light weight manner, providing a limited set of system-call emulations where efficiency gains achievable thereby warrant such emulations. Existing infrastructure may be relied upon, in such examples, to service other file-system related calls so that an entire suite of file-system related calls need not be emulated by a library 40.

Also depicted within the messaging module 34 in FIG. 4 is a segment of shared memory 48a. The segment of shared memory 48a may be shared between the library 40 and the file system 14d and/or between the application 12d and the file system 14d. The segment of shared memory 48a may be operable to receive request parameters from the library 40a and/or the application 12d and/or responses from the file system 14d. Additional discussion of the shared memory 48a is provided below in the discussion of the following two figures.

As discussed above, in some examples, multiple file-system processes may run in the user space 18 and may service different mount points and/or file systems 14. The library layer 42 and/or the messaging module 34 may interact with multiple file-system processes to determine the file system 14 to use for an application request. In examples also involving shared memory, interactions with different file systems 14 in user space may be facilitated by different regions of the shared memory 48 corresponding to the different file systems 14.

Figure 5:
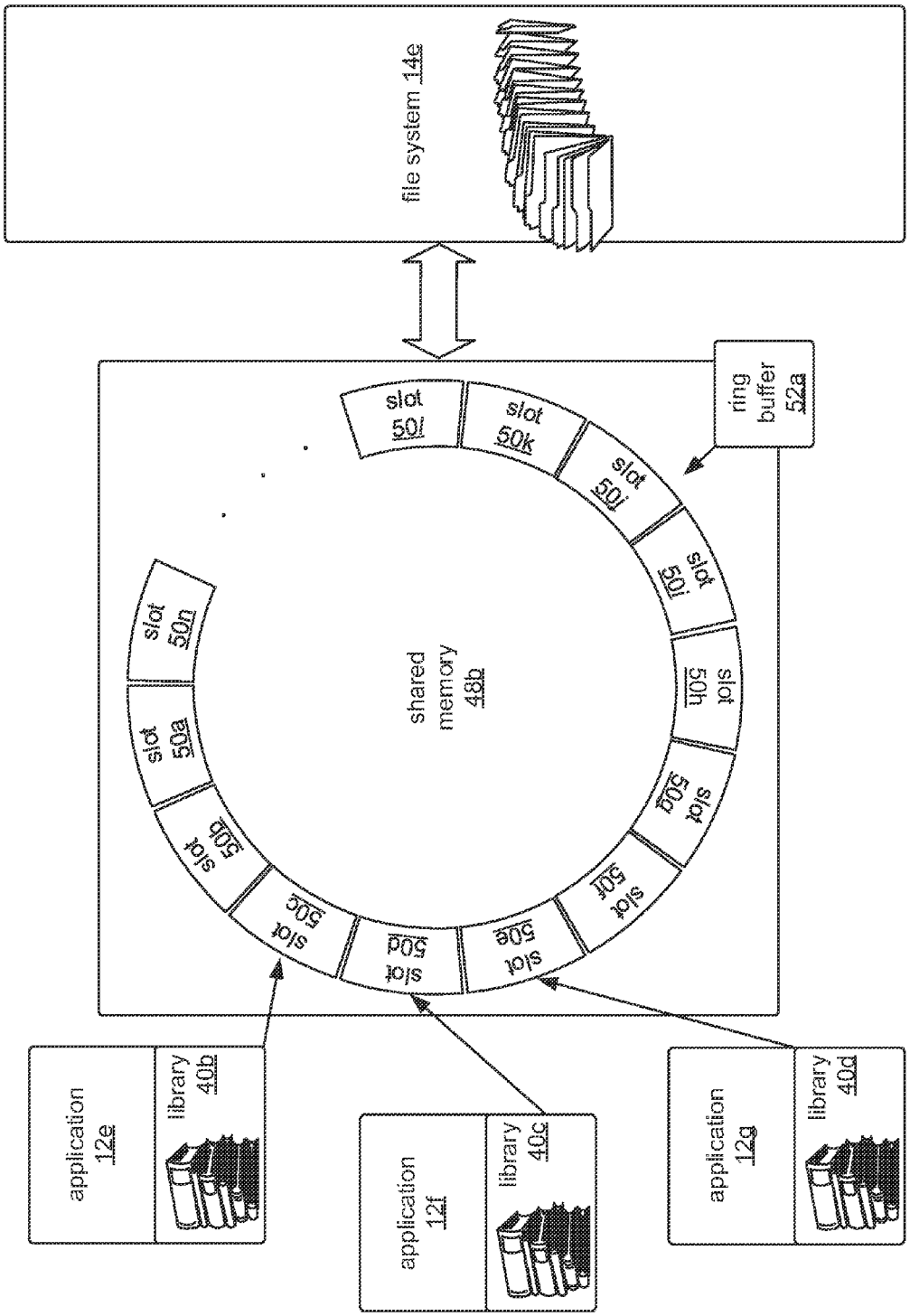
FIG. 5 is a schematic block diagram of a ring buffer implemented in a segment of user-space memory capable of being shared by the user-space file system and multiple applications, the ring buffer including multiple slots, each capable of supporting an individual application's interactions with the file system such that multiple applications may interact concurrently with the file system, in accordance with examples disclosed herein.

Referring to FIG. 5, an enlarged view of the shared memory 48b is depicted in its relations to multiple applications 12e-g and a file system 14e. Each of the multiple applications 12e-g may be coupled with one library instance 40b-d, or one or more applications 12 may communicate directly with the shared memory 48b. Primitives provided by the operating system of the underlying computer system(s) 16, such as a POSIX compliant operating system, may be harnessed to create one or more segments of shared memory 48b, a form of IPC. The segment(s) of shared memory 48b may be created from the user-space memory and may be shared between a process for an application 12 and a process for a file system 14e by providing each process with one or more identifier for the shared memory segment(s) 48b.

In some examples, the process context of each of the multiple applications 12e-g may have an individual copy of the library 40b-d. In other examples, one or more applications 12 may share a copy of the library 40. An array of support slots 50a-n, or message-request slots 50a-n, may be included within the segment of shared memory 48b. Each support/message-request slot 50 may be operable to provide services between a distinct application 12e, 12f, or 12g and the file system 14e, whether through direct communication with an application, or via a library 42. As can be appreciated, the presence of multiple support slots 50a-n within the segment of shared memory 48b may provide support for concurrent implementation of messaging services 32 between the file system 14d and multiple applications 12e-g.

As depicted, in some examples, a ring buffer 52 may be implemented in the segment of user-space memory 48b that makes up the shared memory 48b. The array of support slots 50*a-n* may be implemented as a ring buffer 52. Regardless of their implementation, a support slot 50 may be accessible, whether directly or indirectly, by both an application 12 and the file system 14*e*. The slot 50 may support and/or the shared memory segment 48*b* may support a messaging service 32, at least in part, by storing data, request parameters, responses from the file system 14*e*, and/or other information from an application 12 and/or the file system 14*e*. By providing such infrastructure within user space 18, the shared memory 48*a* may provide a space for customization and greater efficiency.

The operations of retrieving and/or storing data may be used to provide a non-limiting example of messaging services 32 provided by an implementation of the shared memory 48*b*. For example, where an application 12 generated a request to the file system 14*e* that is a retrieval request, an underlying reading operation may be performed by the messaging module 34, and/or by the library 40, on data written to the shared memory 48*b* by the file system 14*e*. On the other hand, where the request to the file system 14*e* is a storage request, the messaging module 34 and/or the library 40 may write data to the shared memory 48*b* for storage by the file system 14*e*.

By way of explaining additional, non-limiting details for possible implementations of shared memory systems 48, an application 12*e*, and/or corresponding library 40*b* may select a free slot 50*c* and/or mark the slot 50 as being used. The application/library 12*e*, 40*b* may then write request parameters to the slot 50*c*, or some other portion of the shared memory 48*b*. In some examples, the application/library/messaging module 12*e*, 40*b*, 34 may utilize the messaging service 32 to signal to the file system 14*e* that request parameters have been written to slot 50*c*. The file system 14*e* may then access the request parameters in the slot 50*c*. In the alternative, or additionally, the file system 14*e* may follow a routine to check the slots 50*a-c* for request parameters. Where the request is a storage request, the request parameters may include and/or be accompanied by data written to the shared memory 48*b* for storage by the file system 14*e*.

From the perspective of the file system 14*e*, after the request parameters are retrieved, the file system 14*e* may carry out the corresponding operation(s) in accordance with the parameters. The file system 14*e* may then mark the slot 50*c* indicating the request, or a portion thereof has been completed and/or signals completion, or progress thereto, to the application 12*e*. The application 12*e* may wait for such a signal and/or engage in polling of the slot 50*c* to detect a completion mark from the file system 14*e*. For requests for data retrieval, the file system 14*e* may write the data to the shared memory 48*a* where it can be read by the application 12*e*.

In a traditional environment, such as that depicted in FIG. 1, an application 12*a* creates an application buffer in the application virtual address space for storage and retrieval operations. For storage operations, the application 12*a* can write the storage data to be stored into the application buffer. The kernel 20*a* then copies the storage data from the application buffer into a kernel buffer for storage on storage media. For retrieval operations, the kernel 20*a* can write the data to be retrieved into the kernel buffer from the relevant storage media. The kernel 20*a* can then copy the retrieved data to the application buffer. As can be appreciated, by sharing memory into which storage data is written by the application 12*e* for storage by the file system 14*e* and/or retrieval data is written by the file system 14*e* for retrieval by the application 12*e* an extra copy may be avoided for both storage and retrieval operations. Additional infrastructure that may be added to make the shared-memory environment set forth above is discussed with respect to the following figure.

Figure 6:
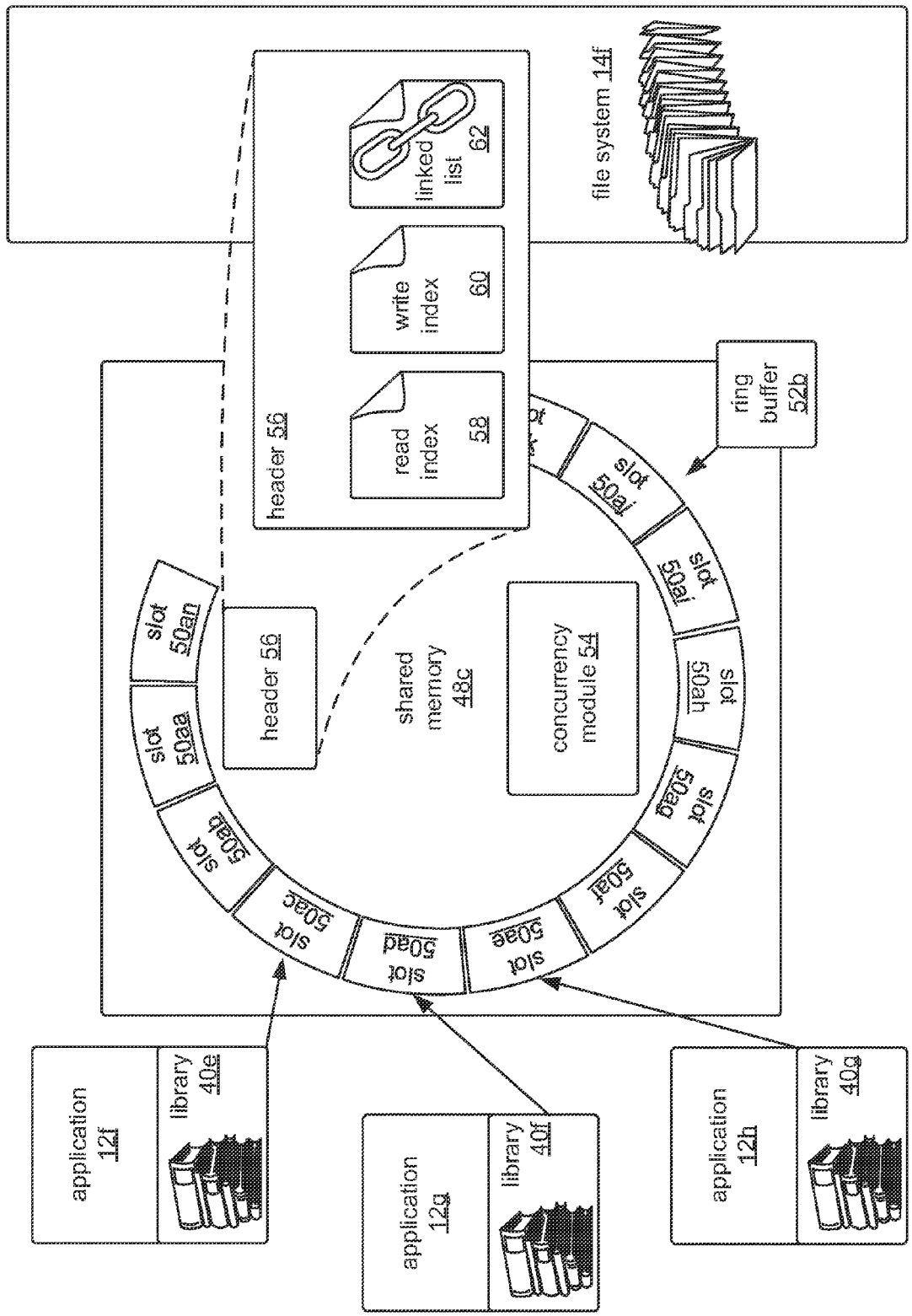
FIG. 6 is a schematic block diagram of a concurrency module operable to arbitrate between demands placed on the user-space file system by multiple applications and/or implement a framework for Quality of Service (QoS) parameters, also depicted is a header to a shared memory segment that may contain one or more indices and/or lists to streamline utilization of the shared memory by applications in their interactions with the file system, in accordance with examples disclosed herein.

Referring to FIG. 6, a concurrency module 54 and a header 56 for shared memory 48 are depicted as examples of additional infrastructure, one or more of which may be added in some examples to improve efficiency and/or add services in a shared-memory environment. In an environment where multiple support slots 50 enable concurrent interactions between multiple applications 12*f-h* and/or one or more corresponding libraries 40*e-g*, a concurrency module 54, which is also referred to herein as a coordination module 54, may be operable to arbitrate between demands placed on the user-space file system 14*f* by the multiple applications 12*f-h*.

By way of a non-limiting example, in some scenarios, the coordination module 54 may be operable to arbitrate between Quality of Service (QoS) demands for file-system requests from the multiple applications 12*f-h* for which a ring buffer 52*b* concurrently supports messaging services 32. In some of such examples, the concurrency/coordination module 54 may reside within the library 40 and be operable to provide a customized service by implementing one or more QoS parameters. One or more of such a QoS parameters may be provided by an application 12, library 40, and/or messaging module 34 for, without limitation, an application, a request, and/or a group of requests. The QoS parameter(s) may dictate, without limitation, a priority relative to other demands placed upon the file system 14*f* by additional requests concurrently directed to the file system 14*f*. In this way, the messaging services 32 may be customized to the file-system requests.

Certain examples may include a header 56, or header section 56, within the shared memory segment 48*c*. The header 56 may provide services to mitigate a need to traverse the ring buffer 52*b* to find an available message-request slot 50. By way of example, the header 56 may include a read index 58, a write index 60, and/or a linked list 62.

A read index 58 may index individual applications 12 to individual message-request slots 50 in the array. In this way, the read index 58 may provide messaging services 32 for system-call emulations related to data retrieval for the individual applications 12. Similarly, a write index 60 may index individual applications 12 to individual message-request slots 50 in the array. Consequently, the write index 60 may provide messaging services 32 for system-call emulations related to data storage for the individual applications 12. A linked list 62 may be provided of free message-request slots 50*a-b* and 50*af-an* currently open for implementing a messaging service 32 for an application 32 and not currently used by or occupied with a messaging service 32 for another application 12.

Figure 7:
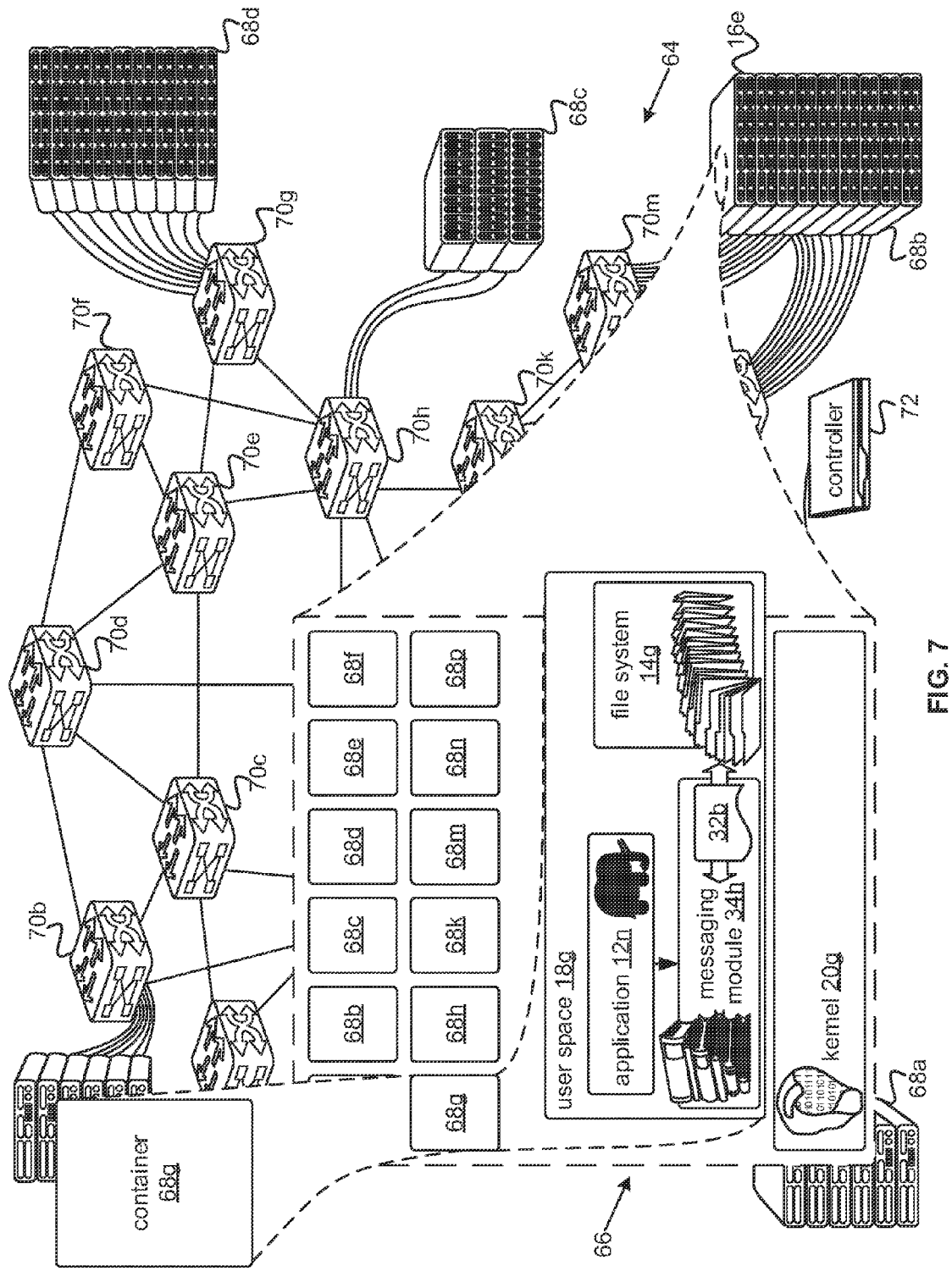
FIG. 7 is a schematic block diagram depicting potential aspects of a system supporting interactions between an application and a file system all within user space in the context of a data center, the diagram also depicting a potential scenario that may involve one or more virtual computing nodes in a virtual computing environment, in accordance with examples disclosed herein.

Referring to FIG. 7, a system is depicted supporting interactions between one or more applications 12 and a file system 14*g* in the context of a data center 64, where the file-system process and interactions with the application(s) 12 take place in user space 18. Also depicted is a virtual computing environment 66, consistent with some examples with one or more virtual computing nodes 68*a-h,k,m,n,p*. In such examples, a computing system 16*e* may support the virtual computing nodes 68*a-h,k,m,n,p*.

The increasing importance of "big data" and the demand for solutions to process larger and larger amounts of data more quickly within a data center 64 has led to the development of several different applications for processing these large amounts of data in a distributed fashion within a data center 64. Such approaches can be particularly demanding on a file system 14, with multiple copies of the data stored and retrieved at various stages of processing. Examples of such applications 12 may include, without limitation, HADOOP (as indicated by the elephant symbol on the application 12*n*), CASSANDRA, and OPENSTACK, among others. Therefore, application of the principles discussed herein may be applied to advantage in a data-center 64, as depicted in FIG. 7.

The figure depicts multiple sets 68*a-e* of computing systems 16 within an overarching computer system 16 that makes up a data center 64. The data center 64 may include several networking nodes 70*a-n*. Although the networking nodes 70*a-n* are depicted in an east-west configuration, other configurations may be used. Also, a controller 72 is depicted, which may be included to support applications, such as HADOOP, that rely on such a centralized computing system 16/72.

For such examples, the process for the file system 14*g* may continue to be implemented in user space 18, together with one or more applications 12*n*, and a library 40*h* and/or a messaging module 34*h* to implement a messaging service 32*b*. The user space 18 may be divided up into multiple instances of user space 18. For example, an individual virtual computing node 68*g*, whether a physical computing node 16 or a virtual computing node 68*g*, may be configured with an isolated instance of user space 18*g* pertaining to the individual virtual computing node 68*g*. In such examples involving virtual computing nodes 68, the file system 14*g* and/or customizing-interface module 34*h* may reside within an isolated instance of user space 18*g* pertaining to a particular virtual computing node 68*g* supported by the computing system 16*e*. An isolated instance of user space 18*g* may be considered as an aspect of an overarching user space 18 pertaining to the virtual computing environment 66 as separate and apart from a common kernel 20*g* supporting the virtual computing environment 66.

As can be appreciated, the virtual computing environment 66 depicted in FIG. 7 does not include a hypervisor, consistent with, for example, an Operating-System (OS)-virtualization environment 66. However, in alternative virtual computing environments incorporating a hypervisor, such as a type-one or a type-two hypervisor, one or more individual virtual computing nodes 68 may be provided with an individual guest operating system, with a kernel 20 specific to a virtual computing node 68. In such examples, each virtual computing node 68 may also be provided with a unique user space 18, pertaining to the overarching user space of the virtual computing environment, together with one or more applications 12, and a library 40 and/or a messaging module 34 to implement a messaging service 32 between an application 12 and a file system 14.

The user-space file system 14*g* may be a local and/or a distributed file system. Where one or more computing systems 16 include multiple networked computing nodes, whether virtual, physical, or both, the term computing system may refer to one or more modified computing environment(s) 30, one or more virtual computing nodes 68, underlying hardware 16, and a networked system of such modified computing environment(s) 30, virtual computing nodes 68, as can be the case in a data center 64. As discussed above, user space 18 may also refer to an isolated instance of user space 18 for a modified computing environment 30 or virtual computing node 68 or some combination of the same pertaining to a networked system.

In some examples, one or more applications 12 may interact with a file system 14 across differing virtual and/or physical computing nodes. Hence, in several examples, a system for providing enhanced file-system services to an application 12 may be implemented in a data-center computing system 64/16 with multiple computing nodes. An open-space file system 14*g* for a data-center 64 may sit in one or more isolated instances of user space 18 and/or be shared across portions of the overarching user space 18 of the data center 64.

The computing nodes of a data center 64 may include multiple virtual computing nodes 68*a-h,k,m,n,p* supported by a virtual computing environment 66. In such examples, the file system 14*g* may reside in user space 18*g* for a virtual computing node 68*g*. The messaging module 34*h* may also reside in user space 18*g* for the virtual computing node 68*g*.

Figure 8:
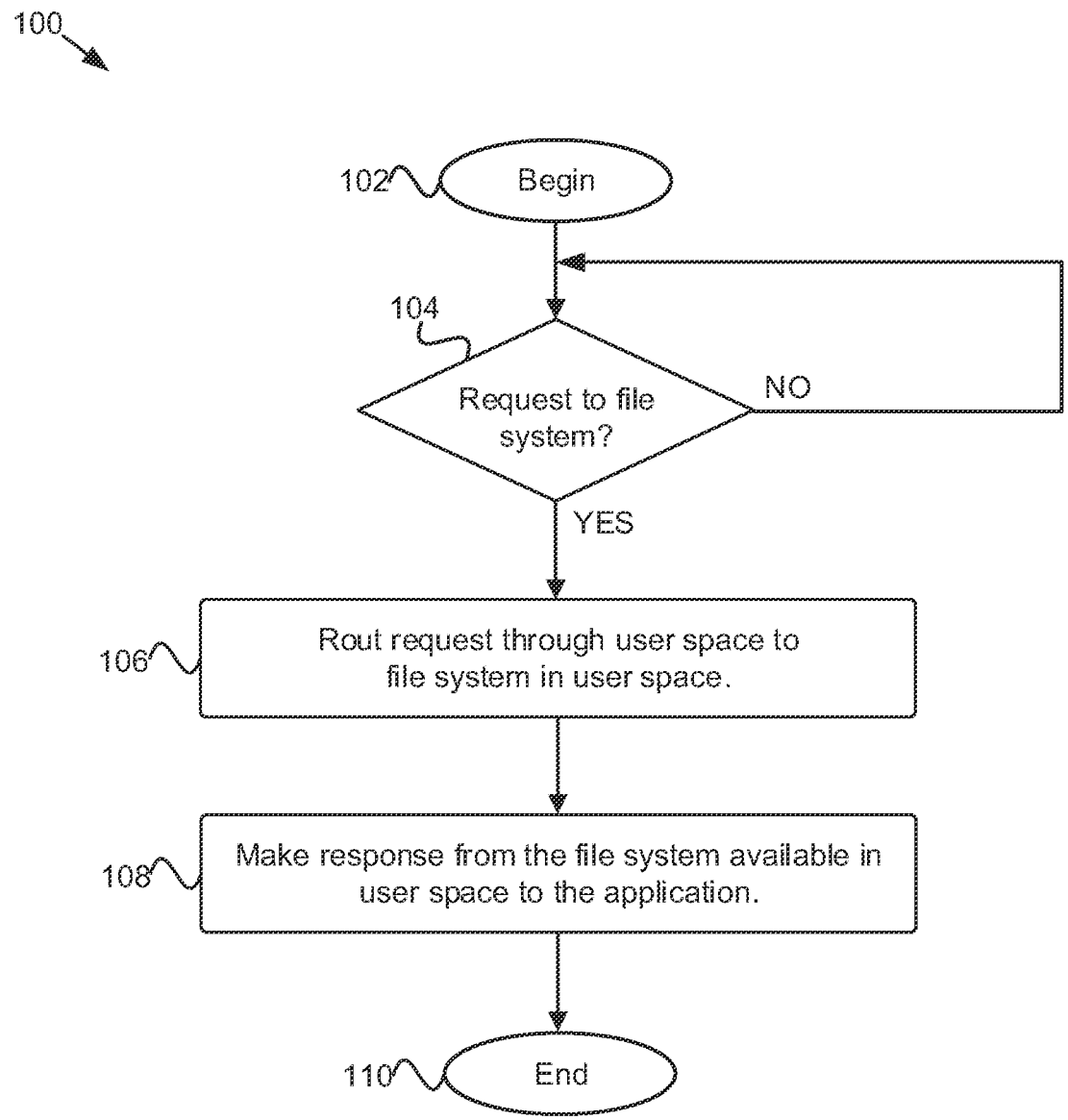
FIG. 8 is a flow chart of methods for enhancing the handling of interactions between an application and a file system, by placing the file system in user space, supporting messaging for such interactions in user space, and avoiding a System Call Interface (SCI) of the kernel, in accordance with examples disclosed herein.
Figure 9:
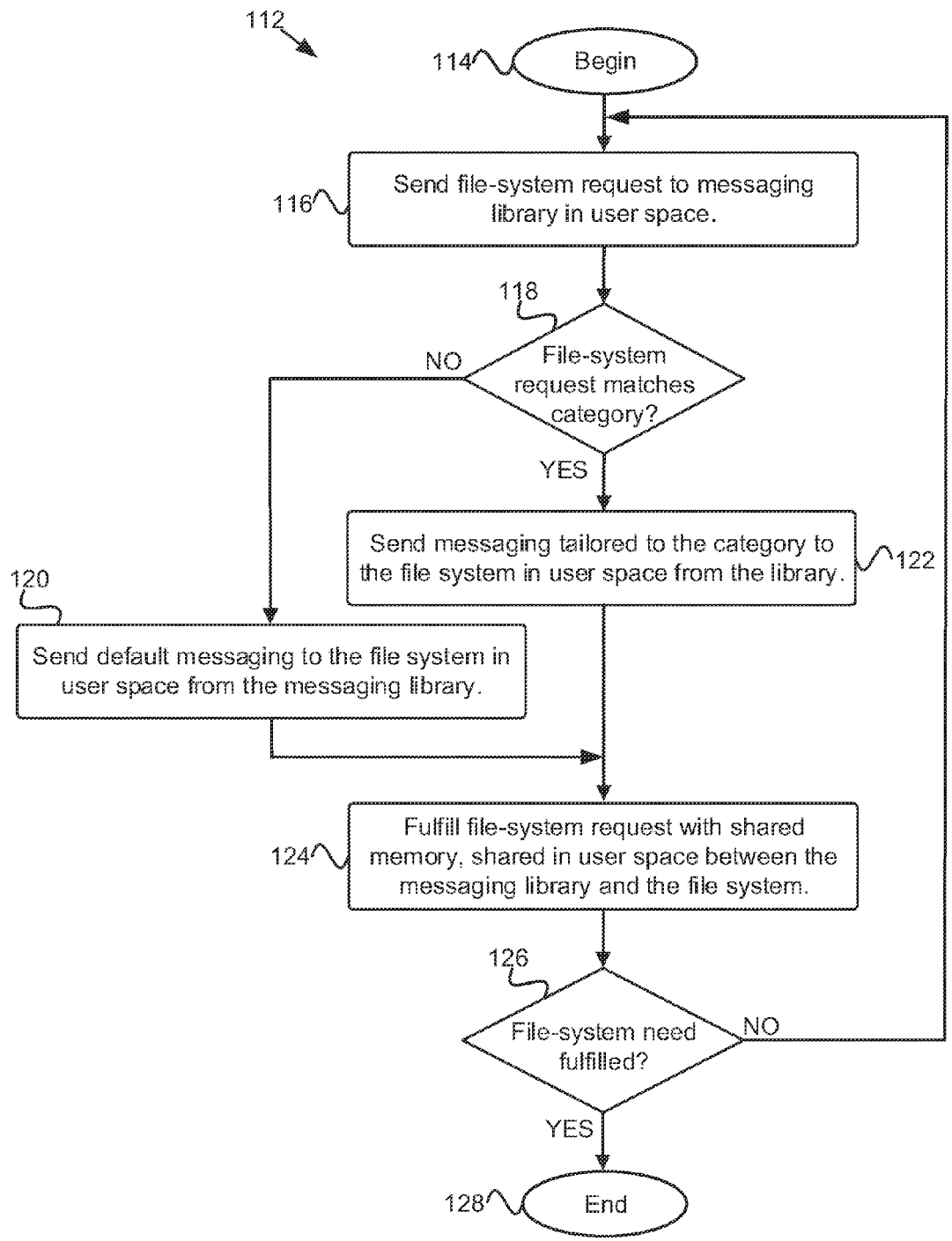
FIG. 9 is a flow chart of methods for using an application-independent library to provide customizable services for interactions between an application and a file system placed in user space, in accordance with examples disclosed herein.

Referring to FIG. 8 and FIG. 9, methods 100, 112 are depicted for enhanced interactions between one or more applications 12 and a file system 14. The flowcharts in FIG. 8 and FIG. 9 illustrate the architecture, functionality, and/or operation of possible implementations of systems, methods, and computer program products according to certain embodiments of the present invention. In this regard, each block in the flowcharts may represent a module, segment, or portion of code, which comprises one or more executable instructions for implementing the specified logical function(s). It will also be noted that each block of the flowchart illustrations, and combinations of blocks in the flowchart illustrations, may be implemented by special purpose hardware-based systems that perform the specified functions or acts, or combinations of special purpose hardware and computer instructions.

Where computer program instructions are involved, these computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block-diagram block or blocks.

These computer program instructions may also be stored in a computer readable medium that may direct a computer or other programmable data processing apparatus to function in a particular manner, such that the instructions stored in the computer-readable medium produce an article of manufacture including instruction means which implement the function/act specified in the flowchart and/or block-diagram block or blocks.

The computer program may also be loaded onto a computer or other programmable data processing apparatus to cause a series of operation steps to be performed on the computer or other programmable apparatus to produce a computer implemented process such that the instructions which execute on the computer or other programmable apparatus provide processes for implementing the functions/acts specified in the flowchart and/or block-diagram block or blocks.

Referring to FIG. 8, methods 100 are depicted for providing enhanced file-system services to one or more applications. Such methods 100 may begin 102 by a determination 104 as to whether a messaging module 34 receives, within user space 18 of a computing system 16, a request from an application 12 to a file system 14. Where the answer to the determination 104 is no, such methods 100 may continue to listen for a request. The file system 14 for such methods 100 may also reside in the user space 18. The computing system 16 may comprise a processor and memory.

Where the answer to the determination 104 is yes, the methods 100 may continue by the messaging module 34 providing one or more efficiency gain for the request by routing 106 the request through the messaging module 34 in the user space 18 to the file system 14 also residing in the user space 14. By routing requests through user space 18, an SCI 24 for the computing system's 16 kernel space 20 may be bypassed, together with limitations imposed by the SCI 24. Efficiency gains may be realized, as discussed above, by avoiding kernel space 20 and/or being freed by limitations imposed by kernel space 20. A response from the file system 14 to the request may be made available 108 by the messaging module 34 for the application 12 in the user space 18. Such methods may then end 110.

Referring to FIG. 9, methods 112 are depicted to provide customizable services in user space 18 for interactions between an application 12 and a file system 14 through an application-independent library 40. The library 40 may reside within a messaging layer 42 below the application 12. The messaging layer 42 may remain within the user space 18 and allow the messaging module 34 to be independent of an approach to formulating the request to the file system 14 utilized by the application 12.

Such methods 112 may begin 114 by sending 116 a file-system request to the messaging library 40 in user space 18. The library 40 may provide system-call emulations by the library 40 within the messaging module 34. Such system-call emulations may include a standard set of system-call emulations operable to emulate standard system calls and/or an enhanced set of system-call emulations operable to respond to application-specific needs.

The methods 112 may make a determination 118 as to whether the file-system request matches a category corresponding to one or more system-call emulations in the library 40. Where the answer is no, default messaging may be sent from the messaging library 40 to the file system 14 in user space 18. Where the answer is yes, the request may be matched to a system-call emulation from the standard set of system-call emulations and/or the enhanced set of system-call emulations and messaging tailored to the category may be sent 122 to the file system in user space 18 from the library 40. The system-call emulation may be carried out. In such examples, the file-system request may be fulfilled 124 with shared memory 48, shared in user space 18 between the messaging library 40 and the file-system 14.

A second determination 126 may be made as to whether file-system needs for the application 12 have been fulfilled. Where the answer is no, the methods 112 may return to the first step of sending 116 another file-system request to the messaging library 40. Where the answer is yes, the methods 112 may end 128.

It should also be noted that, in some alternative implementations, the functions noted in the blocks may occur out of the order noted in the figure. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A system for handling file-system requests comprising:
an application residing in user space of a computing system, the computing system comprising processing logic and memory;
a file system residing in the user space of the computing system; and a customizing-interface module also residing in the user space and operable to provide a messaging service, within the user space, between the application and the file system, the messaging service supporting a file-system request from the application to the file system, the file-system request providing a non-standard system call, with functionality beyond options offered by a System Call Interface (SCI), newly customized to more efficiently meet requirements of the application, the messaging service made customizable by bypassing the SCI of kernel space pertaining to the computing system.

2. The system of claim 1, further comprising:
library layer within the user space and below the application;
a collection module operable to trap, from the application, system calls sent by the application to the SCI for implementation of file-system requests; and
the library layer comprising the customizing-interface module, the customizing-interface module being application agnostic, as enabled by the library layer being separate from the application, the customizing-interface module further comprising:
a library with a set of system-call emulations supported within the messaging service;
the set of system-call emulations comprising a first subset of emulations of standard system calls and a second subset of emulations of non-standard system calls offering customizable options for the file-system request beyond options offered by the SCI of the computing system's kernel space.

3. The system of claim 2, wherein the library matches application-identification information from the system-call requests to the non-standard system calls to provide enhanced interactions between the application and the file system through the messaging service to customize the messaging service to the file-system request.

4. The system of claim 2, the library further comprising:
an analysis module operable to analyze the file-system requests from the application to identify the requirements of the application; and
a generation module operable to generate the non-standard system call with new functionalities tailored to the application.

5. The system of claim 2, the library further comprising:
an analysis module operable to analyze the file-system requests from the application to detect a pattern; and
an anticipation module operable to implement at least one of caching and pre-fetching of data at the library layer, the data anticipated by the pattern, in a segment of library memory locally shared with the file system.

6. The system of claim 1, wherein:
the computing system supports virtual computing nodes; and
the file system and the customizing-interface module reside within an isolated instance of user space pertaining to a particular virtual computing node supported by the computing system.

7. The system of claim 1, further comprising a shared memory segment within the customizing-interface module, the shared memory segment:

accessible by both the application and the file system; and operable to support the messaging service by storing data from the application written to the shared memory segment and read by the file system for storage by the file system, by storing a request from the application for reading by the file system, and by storing data written by the file system for the application and responsive to the request.

8. The system of claim 7, the shared memory segment further comprising:
a ring buffer, the ring buffer comprising: an array of message-request slots, a message-request slot operable to implement a message service between an application and the file system such that multiple message-request slots from the array implement messaging services between the file system and multiple applications concurrently.

9. The system of claim 8, further comprising a coordination module operable to arbitrate between quality of service demands for file-system requests from the multiple applications for which the ring buffer concurrently supports messaging services, thereby customizing the messaging services to the file-system requests.

10. The system of claim 8, further comprising a header section within the shared memory segment, the header operable to mitigate a need to traverse the ring buffer to find an available message-request slot and comprising at least one of:
a read index, indexing individual applications to individual message-request slots in the array providing messaging services for system call emulations related to data retrieval for the individual applications;
a write index, indexing individual applications to individual message-request slots in the array providing messaging services for system call emulations related to data storage for the individual applications; and
a linked list of free message-request slots not currently used to implement a messaging service for an application.

11. A method for providing enhanced file-system services to an application, comprising:
receiving, by shared memory in user space, shared by an application and a messaging module and a file system residing at a computing system, comprising a processor and memory, a-request parameters for the file system, the application, the messaging module, and the file system also residing in the user space;
providing, by the messaging module, at least one efficiency gain for a request from the application to the file system by providing the request parameters to the shared memory to the request through the messaging module in the user space to the file system and bypass a system call interface for a kernel space pertaining to the computing system;
interacting with a storage media device for storage retrieval operations, consistent with the request parameters, by a user-space device driver in the messaging module, operable to perform I/O operations on the storage media device in the user space without first writing the data to kernel space; and
reading, by the application, responses to the request parameters retrieved from the storage media device by the user-space device driver, without use of a buffer in kernel space.

12. The method of claim 11, further comprising:
providing, a library within the messaging module, including in the library, a non-standard system-call tailored to respond to application-specific needs for at least one of reading from and writing to storage;
matching the request to the non-standard system call; and
carrying out the non-standard system call by providing the request parameters, corresponding to the non-standard system-call, to the shared memory,
the library residing within a messaging layer below the application, the messaging layer remaining within the user space and allowing the messaging module to be independent of an approach to formulating the request to the file system utilized by the application.

13. The method of claim 12, further comprising:
analyzing, by the library, requests from the application to detect a pattern of requests from the application to the file system;
pre-fetching, by the library, data into memory for anticipated requests to anticipate the pattern of requests.

14. A system for providing enhanced file-system services to an application in a data-center computing system, further comprising:
a local file system operable to function within user space of memory of at least one hardware processor of a compute node, the compute node within a data-center comprising multiple computing nodes, each compute node having a hardware processor and memory;
a messaging module also operable to function in user space of the memory of the at least one hardware processor of the compute node and to broker requests from an application to the local file system and responses to the requests within user space, avoiding constraints on interactions imposed by a kernel-space interface for system calls;
a library within the messaging module operable to provide storage and retrieval interactions on and from, respectively, a storage media device by handling I/O operations in user space with a user-space device driver for an efficiency not offered by the kernel-space interface for system calls; and
shared memory, in the user space, shared by the application and the library and the file system and operable to receive request parameters for the file system and responses to the request parameters retrieved from the storage medium device by the user-space device driver, without use of a buffer in kernel space, for reading by the application.

15. The system of claim 14, further comprising an independent layer within user space and below the application, the messaging module and the library separated from the application by the independent layer and operable to service different applications;
an analysis module in the library and in the memory of the at least one hardware processor of the compute node, the analysis module operable to analyze the requests from the application for a pattern among the requests;
a segment of shared memory operable to receive data from the file system; and
the library operable to provide at the least one service customized to the application by at least one of caching and pre-fetching data from a local storage device by the file system, the data anticipated by the pattern detected among the requests.

16. The system of claim 14, further comprising an array of support slots within the shared memory, each support slot operable to hold data for a distinct application, the data to be both retrieved from the storage medium device and stored on the storage medium device by the user-space device driver in accordance with requests by the distinct application to the library for the file system.

17. The system of claim 16, further comprising a concurrency module in the memory of the at least one hardware processor of the compute node and operable to provide a customized service by implementing a quality of service parameter for at least one of an application, a request, and a group of requests, the quality of service parameter dictating a priority relative to other demands placed upon the file system by additional requests concurrently directed to the file system.

18. The system of claim 14, wherein:
the computing nodes of the data center include multiple virtual computing nodes supported by a virtual computing environment;
the file system resides in an instance of user space unique to an individual virtual computing node; and
the messaging module also resides in the instance of user space unique to the individual virtual computing node.

* * * * *